(12) United States Patent
Chandramohan et al.

(10) Patent No.: US 11,716,316 B2
(45) Date of Patent: Aug. 1, 2023

(54) ACCESS TO FEDERATED IDENTITIES ON A SHARED KIOSK COMPUTING DEVICE

(71) Applicant: Okta, Inc., San Francisco, CA (US)

(72) Inventors: Kavitha Chandramohan, Ontario (CA); Johannes Stockmann, Woodinville, WA (US)

( * ) Notice: Subject to any disclaimer, the term of this patent is extended or adjusted under 35 U.S.C. 154(b) by 288 days.

(21) Appl. No.: 17/118,426

(22) Filed: Dec. 10, 2020

(65) Prior Publication Data
US 2022/0191186 A1    Jun. 16, 2022

(51) Int. Cl.
*H04L 9/40* (2022.01)
*H04L 67/143* (2022.01)

(52) U.S. Cl.
CPC ...... *H04L 63/0815* (2013.01); *H04L 63/0442* (2013.01); *H04L 63/0861* (2013.01); *H04L 63/0876* (2013.01); *H04L 63/108* (2013.01); *H04L 67/143* (2013.01)

(58) Field of Classification Search
CPC ............ H04L 63/0815; H04L 63/0442; H04L 63/0861; H04L 63/0876; H04L 63/108; H04L 67/143
See application file for complete search history.

(56) References Cited

U.S. PATENT DOCUMENTS 9,548,976 B2 * 1/2017 Belote .................. G06F 21/41
10,396,985 B1 * 8/2019 Nagelberg ............ H04L 9/3247
2008/0021997 A1 * 1/2008 Hinton ................ H04L 63/0815
    709/225
2008/0028453 A1   1/2008 Nguyen et al.
2008/0235361 A1 * 9/2008 Crosbie ................ G06F 9/5027
    709/223
2009/0217367 A1 * 8/2009 Norman .............. H04L 63/0815
    726/8

(Continued)

FOREIGN PATENT DOCUMENTS

KR    10-2012-0120955 A    11/2012

OTHER PUBLICATIONS

"What Is Federated Identity?", https://www.okta.com/identity-101/what-is-federated-identity/, Dec. 2020, 6 pages (Year: 2020).*

(Continued)

*Primary Examiner* — Han Yang
(74) *Attorney, Agent, or Firm* — Holland & Hart LLP

(57) ABSTRACT

A kiosk device is shared by many users of an organization in a sequential manner. The kiosk is provisioned so that each of the appropriate users of the organization may use it, and so that each such user may be provided with a federated identity by an external identity provider (IdP) system. The federated identity may be used to automatically provide the user with access to the user's different resources (e.g., the user's accounts on various third-party applications). An authenticator component of the kiosk device communicates with the external IdP system so as to securely and transparently provide the users with a federated identity. In order to provide additional security, the authenticator component and/or the IdP system may take into account organization-specific details when authenticating a user, such as whether a particular user is expected to be on duty with the organization at the current time.

20 Claims, 3 Drawing Sheets

(56) References Cited

U.S. PATENT DOCUMENTS

| | | | |
|---|---|---|---|
| 2011/0225426 A1* | 9/2011 | Agarwal | G06F 21/41 |
| | | | 713/175 |
| 2012/0227094 A1 | 9/2012 | Begen et al. | |
| 2022/0173890 A1* | 6/2022 | Momchilov | H04L 63/0853 |
| 2022/0210156 A1* | 6/2022 | Shah | H04L 63/0884 |

OTHER PUBLICATIONS

"Public Computer Management", https://www.cybrarian.com/, 2019, 5 pages (Year: 2019).*
PCT International Search Report and Written Opinion, PCT Application No. PCT/US2021/062497, dated Jun. 30, 2022, nine pages.

* cited by examiner

ACCESS TO FEDERATED IDENTITIES ON A SHARED KIOSK COMPUTING DEVICE

FIELD OF ART

The present invention generally relates to the field of software systems, and more specifically, to facilitating user login for identity provider systems that authenticate user identities.

BACKGROUND

Users of computer systems typically have multiple accounts with different systems, such as various third-party applications and/or websites, with different credentials (e.g., username and password or other factors) for each. The need of users to authenticate their identities separately for each of their separate accounts in order to access their resources on those accounts requires significant effort and reduces the productivity of those users due to the need to remember credentials and enter those credentials for each of their accounts. This difficulty may further lead to security risks if users attempt to mitigate the difficulty through ill-advised practices such as password reuse, listing passwords in insecure locations, or the like.

Users affiliated with an organization may access organization computing devices in a temporally serial manner. For example, users that are employees of a business may work in shifts, such as an 8 AM to 12 PM shift, a 12 PM to 4 PM shift, a 4 PM to 8 PM shift, and so forth. During their shifts, or other times that the users are active, the users will typically need to use a shared computing device of their organization—such as a laptop at a medical facility, a smartphone shared by guards of a security company, or the like—to perform tasks on behalf of the organization. (This shared computing device of an organization is hereinafter referred to herein as a "kiosk device," or "kiosk" for brevity.) The users will typically need to use multiple accounts/applications to accomplish their tasks, such as an account for a financial book-keeping service, an account on a reporting system, an email account, a timekeeping account, and the like. The schedules of these users may dictate that only one user (or, more generally, some particular number of users determinable based on current variables such as day, time, or the like) may be able to use the kiosk device at any given time.

Users such as users of kiosk devices could benefit greatly from the ability to use federated identities linking their identities for their various accounts, and applications thereof such as single sign-on (SSO) to automatically log them into their different accounts. However, providing federated identities in a secure manner is a technically complex problem beyond the capabilities of most organizations. The problem is particularly difficult in the context of kiosk devices, since they are shared by multiple different users and thus potentially vulnerable to the credentials of all users being discoverable by anyone with access to the kiosk.

SUMMARY

A kiosk device is shared by many users of an organization in a sequential manner. The kiosk is provisioned so that each of the appropriate users of the organization may use it, and so that each such user may be provided with a federated identity by an external identity provider (IdP) system. The federated identity may be used (e.g., by the external IdP system) to automatically provide the user with access to the user's different resources (e.g., the user's accounts on various third-party applications).

An authenticator component of the kiosk device communicates with the external IdP system so as to securely and transparently provide the users with a federated identity. In order to provide additional security, the authenticator component and/or the IdP system may take into account organization-specific details when authenticating a user, such as whether a particular user is expected to be on duty with the organization at the current time. To provide further security in view of the shared nature of the kiosk device, the authenticator component may act to minimize the risk of inappropriate system accesses, such as ending the sessions of a user after appropriately short timeout periods, or based on known work schedules of the user, or the like. To further enhance security the authenticator component may also permit access of a user to the federated identity features of the kiosk device only when the users are using it in the expected sequential manner (e.g., when no other users already have established sessions on the kiosk device).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
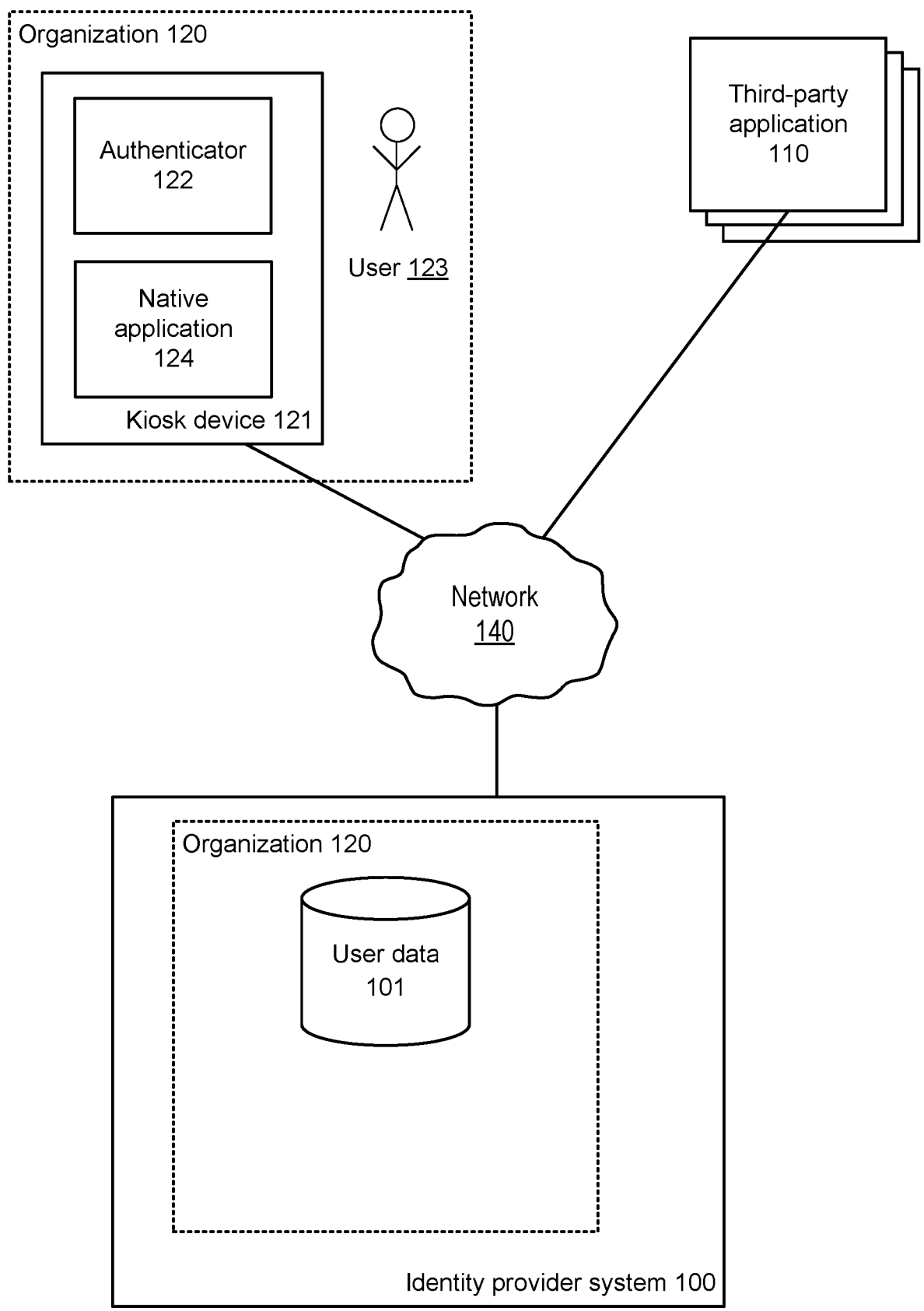
FIG. 1 illustrates one embodiment of a computing environment in which users of an organization use a shared kiosk device to accomplish tasks on behalf of the organization.

FIG. 1 illustrates one embodiment of a computing environment in which users of an organization use a shared kiosk device to accomplish tasks on behalf of the organization. An authenticator component of the kiosk device facilitates providing users with federated identities by securely and transparently communicating with an external identity provider system ("IdP system") that handles the details of identity federation and provides related identity services. In this way, the users of the organization simply and securely obtain access to the various third-party accounts or other resources that they need to complete tasks on behalf of the organization.

The organization 120 is an entity, such as a business, a school, a governmental agency, or the like, that has a number of affiliated users 123, such as employees or volunteers. The organization also has one or more kiosk devices 121 that the users 123 use to perform tasks on behalf of the organization. For example, healthcare workers such as nurses at a hospital may use a workstation computer to log data about their patients, to record their time, to send messages, and the like. In this scenario, a particular such workstation may be within the exclusive control of a particular nurse during the nurse's shift, and may then come under the exclusive control of the nurse who assumes responsibility during the next shift. Similarly, security guards of a security company may use a shared smartphone during their respective shifts to log information and send messages as they patrol at their assigned location.

The users typically use a number of distinct resources from different providers, such as different third parties, or the organization 120 itself. Such resources could include applications (e.g., email applications, timekeeping applications, spreadsheet applications, etc.), databases, files, or the like. The third-party applications illustrated in FIG. 1 are one example of such resources. Such applications could be, for example, entirely web-based on an application server 110 and accessible through a web browser, or could be accessible through a native application 124 installed on the kiosk device 121 and communicating with a remote application server 110. (The terms "application 110", "application 124", or simply "application", are sometimes used synonymously herein to generally denote the functionality of a particular application, whether it is implemented solely on an application server 110 and run within a web browser of the kiosk device, or partially on an application server 110 and partially within a local native application 124.) Since each application or other resource could be from a different provider—each of which could have a different identity for a user—a single user will typically have many different identities and associated credentials corresponding to the different resources that the user uses.

The identity provider system (IdP system) 100 provides the user 123 with a federated identity linking the various identities of the user on the different accounts (e.g., the third-party applications 110/124) or other resources to which the user has access. The IdP system 100 stores user data 101 that include a set of identities of known users whose identities may be identified on the IdP system 100. The user data 101 may include a form of identity on the IdP system 100 such as a username, as well as other credential data associated with a user, such as a user password or information derived therefrom. The user data 101 may also include many other types of data about users, such as the factor types and providers that they may use when seeking identity verification from the IdP system 100, their role(s) or group(s) within the organization 120 to which they belong (e.g., "Engineering", "Legal", "Manager 2", "Director", or the like), and/or the resources to which they have access (e.g., third-party applications 110 such as SALESFORCE, MICROSOFT OFFICE 365, SLACK, or the like), as some examples. The user data 101 may also include identities and credentials of the various users on the various accounts to which they have access, thereby linking a user's identity on the IdP system 100 to the user's identities on those different accounts and permitting access to those accounts.

In some embodiments, the IdP system 100 includes single sign-on (SSO) functionality that allows the IdP system to transparent log a user in to the different accounts or other resources to which the user has access. For example, for a given user who has logged in to the IdP system 100, the IdP system can look up the user's accounts or other resources within the user data 101, as well as the user's credentials for those accounts. Using the credentials, as well as metadata or other information about the accounts, IdP system 100 can automatically log the user into the applications or other resources described in the user data 101, such as by establishing application sessions with the various applications and providing corresponding session data (e.g., session tokens) to the device 121. Thus, with a single login to the IdP system 100, the SSO functionality of the IdP system provides a user with automatic access to all the user's accounts or other resources.

Physically, the organization 120 is made up of a number of computing systems, including the various kiosk devices 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
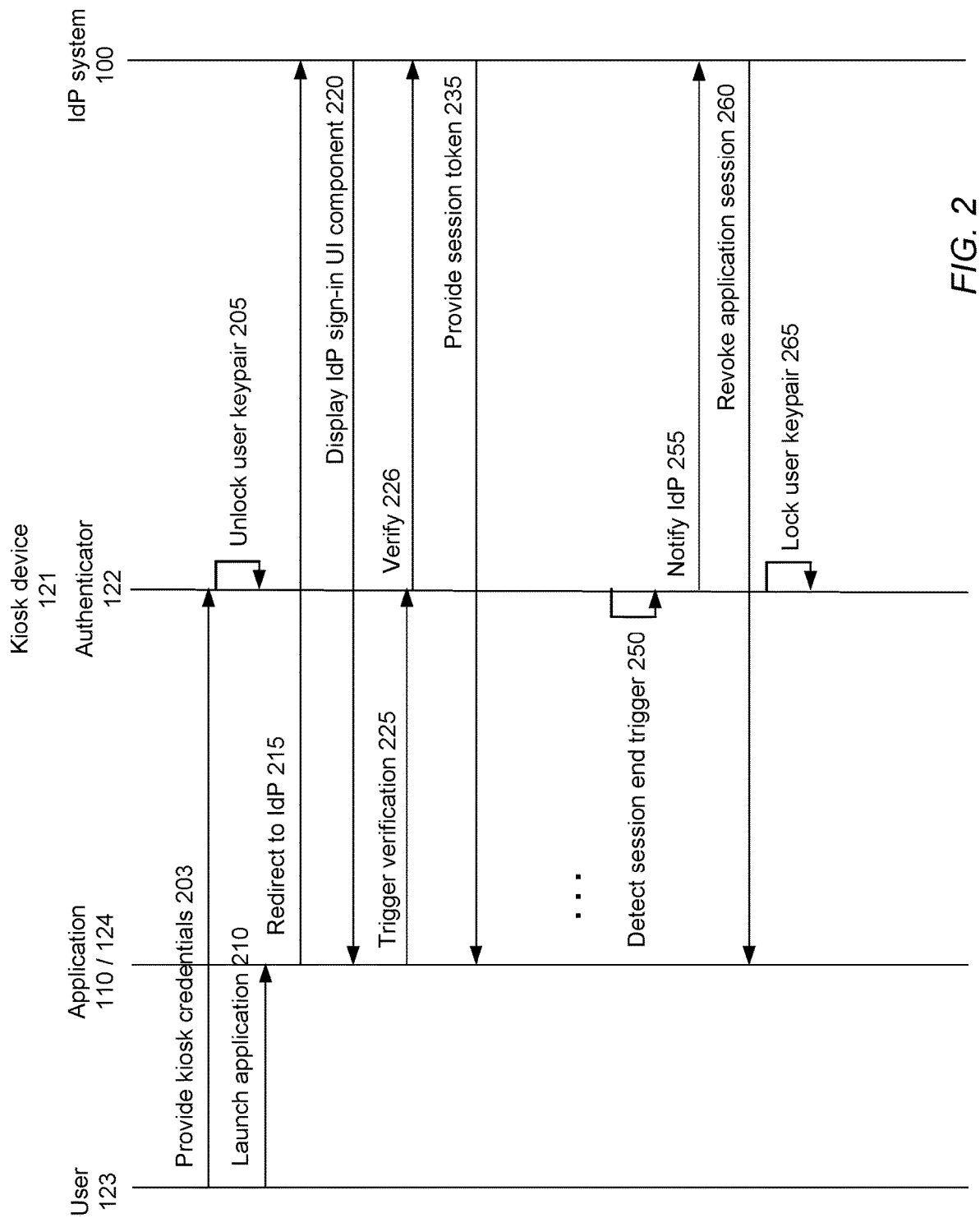
FIG. 2 illustrates the interactions between a user, application or other resource, authenticator component, and IdP system when the user uses a kiosk device to obtain and use a federated identity, according to some embodiments.

FIG. 2 illustrates the interactions between a user 123, application 110/124 or other resource, authenticator component 122, and IdP system 100 when the user uses a kiosk device 121 to obtain and use a federated identity, according to some embodiments.

Before the user 123 uses the kiosk device 121, the kiosk device is appropriately provisioned (e.g., by an administrator of the organization 120, or by the user himself/herself) during an enrollment phase. For example, for each user to be granted access to the kiosk device 121, federated identity credentials (e.g., a <public key, private key> keypair) corresponding to that user and to the kiosk device are created. In embodiments in which the federated identity credentials are a keypair, the public key is registered with the IdP system 100 in association with the user. Additionally, kiosk credentials (such as a personal identification number (PIN) or biometric data) are established for the user as the credentials that the user uses to gain access the kiosk device 121. The kiosk credentials may also be used to encrypt the federated identity credentials (e.g., keypair) to prevent them from being obtained by unauthorized users.

FIG. 2 begins with a user 123 starting a work shift or other period of time in which the user is eligible to use the kiosk device 121. In order to use the federated identity functionality of the kiosk device 121, the user 123 unlocks 205 the user's keypair or other federated identity credentials, e.g., by providing 203 the user's kiosk credentials. As a result, the user's account status is set to "active" and consequently the user's keypair is available for use.

The user 123 launches 210 an application 110 (e.g., that the user wishes to user to accomplish the user's work). In the example of FIG. 2, the user 123 does not yet have an active session with the IdP system 100, and the user is accordingly redirected 215 to the IdP system 100 to establish a session. In some embodiments, such as that illustrated in FIG. 2, the redirection is accomplished by a plugin or other component of the application 110 designed to interact with the IdP system 100 (and, for example, created by the same entity that controls the IdP system 100); in other embodiments, the redirection is achieved by other means, such as by a proxy server located in a local network in which the kiosk device 121 is located. If the user 123 had already had an active session with the IdP system 100 on the kiosk device 121, step 215 (and step 220) would not be needed.

In response to the redirection, the IdP system 100 causes display 220 of an IdP sign-in user interface component on the kiosk device 121, the selection of which triggers 225 verification 226 of the user's identity by the authenticator component 122. For example, the verification 226 may involve the authenticator 122 sending the IdP system 100 a message signed with the private key of the keypair generated for the user 123 during initial provisioning of the user's account on the kiosk device 121 and unlocked in step 205. Since the IdP system 100 obtained and registered the public key of the keypair in association with the user 123 and the kiosk device 121 during provisioning, the IdP system 100 can then verify the identity of the user using the registered information, such as by using the public key to verify the signature. The sign-in user interface component can be, for example, a list of user-enrolled factors for authentication, including the authenticator component 122.

With the user's identity verified, the IdP system 100 can provide 235 a session token for the application session to the kiosk device 121, which can in turn provide the session token to the application 110/124. The application 110/124 can use the application token to initiate a session between the user 123 and the application, such as by initiating a Security Assertion Markup Language (SAML) flow.

At some later point, the authenticator component 122 detects 250 a trigger signaling the end of the user's session. The trigger could be explicit, such as the user 123 using a user interface provided by the kiosk device 121 (e.g., a "Go off duty" button), which the user could use when leaving at the end of the user's work shift, or when taking a break, for example. Alternatively, the trigger can be implicit, such as the elapse of some period of inactivity (e.g., 15 minutes, or a time period specified by organization policy), or the known end of the user's work shift or other expected time of activity (e.g., as stored in the user data 101 or on the kiosk device 121 itself).

As a result of detection of the end of session trigger, the authenticator component 122 takes steps to ensure that the active sessions cannot be improperly used. Specifically, the authenticator component 122 notifies 255 the IdP system 100 of the session end trigger. As a result, the IdP system 100 revokes 260 the application session of the user 123 with the application 110 by sending a session revocation message to the server of the application 110, as well as to the servers of any other applications with which the IdP system established application sessions on behalf of the user. Thus, once the user 123 has ceased using the kiosk device 121, unauthorized parties are unable to use the application sessions established via the IdP system 100 to gain access to the user's account on the applications, since the sessions with those applications have been revoked.

The authenticator component 122 may additionally lock 265 the keypair of the user 123 (e.g., list the status of the account as "not active") so that unauthorized parties cannot re-establish a session with the IdP system 100 to masquerade as the user.

Figure 3:
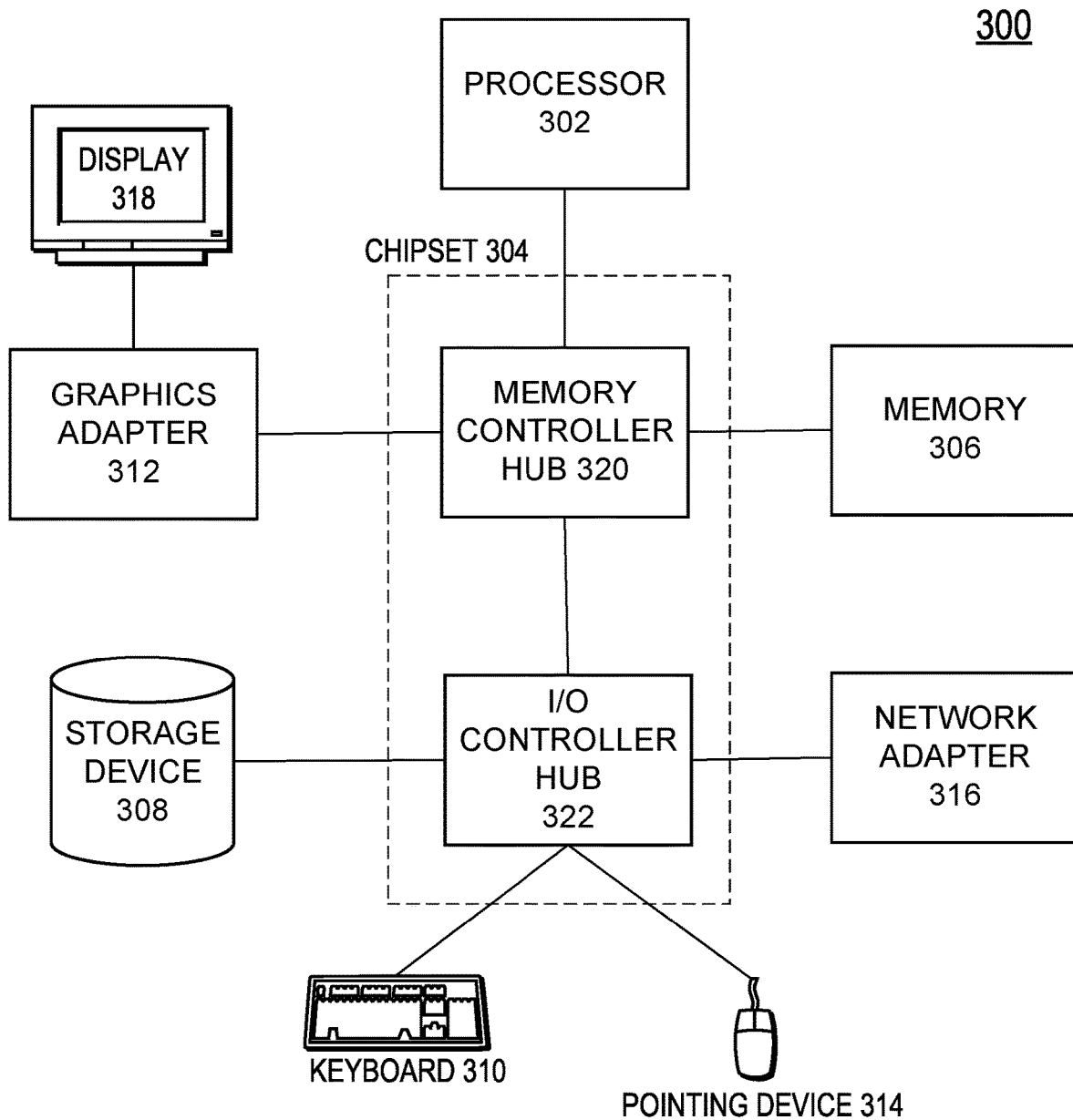
FIG. 3 is a high-level block diagram illustrating physical components of a computer used as part or all of (for example) the identity provider or kiosk device of FIG. 1, according to one embodiment.

FIG. 3 is a high-level block diagram illustrating physical components of a computer 300 used as part or all of (for example) the identity provider 100 or kiosk device 121, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for providing federated identity services for a kiosk device shared among a plurality of users of an organization and containing federated identity credentials for each of the plurality of users, the method comprising:
    accessing, at the kiosk device by a user of the organization, a third-party application;
    receiving, at the kiosk device from the user, kiosk credentials of the user;
    unlocking, using the kiosk credentials, federated identity credentials of the user stored on the kiosk device; and
    using the unlocked federated identity credentials to authenticate the user with an identity provider (IdP) system and to cause the IdP system to begin application sessions for the user on the kiosk device with the third-party application and with a plurality of other third-party applications.

2. The computer-implemented method of claim 1, further comprising:
    detecting a session end trigger; and
    responsive to the detecting, causing revocation of the application sessions with the third-party application and with the plurality of other third-party applications.

3. The computer-implemented method of claim 2, further comprising, responsive to the detecting, locking the unlocked federated identity credentials.

4. The computer-implemented method of claim 2, wherein detecting the session end trigger comprises identifying an elapse of a threshold period of inactivity.

5. The computer-implemented method of claim 2, wherein detecting the session end trigger comprises identifying a user interface action of the user.

6. The computer-implemented method of claim 2, wherein detecting the session end trigger comprises:
    determining that the user is no longer within a period of time in which the user is scheduled to using the kiosk device.

7. The computer-implemented method of claim 1, wherein the kiosk credentials comprise at least one of a personal identification number (PIN) or biometric data.

8. The computer-implemented method of claim 1, wherein the federated identity credentials comprise a <public key, private key> keypair.

9. The computer-implemented method of claim 8, wherein using the unlocked federated identity credentials to authenticate the user with the IdP system comprising generating a signature using the private key.

10. The computer-implemented method of claim 1, further comprising:
    receiving, at the kiosk device from a second user of the organization, kiosk credentials of the second user;
    determining that a session of the user on the kiosk device has not yet ended; and
    responsive to the determining, refraining from causing the IdP system to begin application sessions for the second user on the kiosk device.

11. The computer-implemented method of claim 1, wherein authenticating the user with the IdP system comprising sending to the IdP system an indicator that the kiosk device is operating in kiosk mode.

12. A non-transitory computer-readable storage medium for providing federated identity services for a kiosk device shared among a plurality of users of an organization and containing federated identity credentials for each of the plurality of users, the non-transitory computer-readable storage medium storing instructions that when executed by a computer processor perform actions comprising:
    accessing, at the kiosk device by a user of the organization, a third-party application;

receiving, at the kiosk device from the user, kiosk credentials of the user;

unlocking, using the kiosk credentials, federated identity credentials of the user stored on the kiosk device; and using the unlocked federated identity credentials to authenticate the user with an identity provider (IdP) system and to cause the IdP system to begin application sessions for the user on the kiosk device with the third-party application and with a plurality of other third-party applications.

13. The non-transitory computer-readable storage medium of claim 12, the actions further comprising:

detecting a session end trigger; and responsive to the detecting, causing revocation of the application sessions with the third-party application and with the plurality of other third-party applications.

14. The non-transitory computer-readable storage medium of claim 13, the actions further comprising, responsive to the detecting, locking the unlocked federated identity credentials.

15. The non-transitory computer-readable storage medium of claim 13, wherein detecting the session end trigger comprises identifying an elapse of a threshold period of inactivity.

16. The non-transitory computer-readable storage medium of claim 13, wherein detecting the session end trigger comprises identifying a user interface action of the user.

17. The non-transitory computer-readable storage medium of claim 13, wherein detecting the session end trigger comprises:

determining that the user is no longer within a period of time in which the user is scheduled to using the kiosk device.

18. The non-transitory computer-readable storage medium of claim 12, wherein the kiosk credentials comprise at least one of a personal identification number (PIN) or biometric data.

19. The non-transitory computer-readable storage medium of claim 12, wherein the federated identity credentials comprise a <public key, private key> keypair.

20. A kiosk device shared among a plurality of users of an organization and containing federated identity credentials for each of the plurality of users, the kiosk device comprising:

a computer processor; and a non-transitory computer-readable storage medium, the non-transitory computer-readable storage medium storing instructions that when executed by the computer processor perform actions comprising:

accessing, at the kiosk device by a user of the organization, a third-party application;

receiving, at the kiosk device from the user, kiosk credentials of the user;

unlocking, using the kiosk credentials, federated identity credentials of the user stored on the kiosk device; and using the unlocked federated identity credentials to authenticate the user with an identity provider (IdP) system and to cause the IdP system to begin application sessions for the user on the kiosk device with the third-party application and with a plurality of other third-party applications.

* * * * *